United States Patent [19]

McKendrick

[11] Patent Number: 5,208,995
[45] Date of Patent: May 11, 1993

[54] FIXTURE GAUGE AND METHOD OF MANUFACTURING SAME

[76] Inventor: Blair T. McKendrick, 29684 Kenloch Dr., Farmington Hills, Mich. 48331

[21] Appl. No.: 858,877

[22] Filed: Mar. 27, 1992

[51] Int. Cl.⁵ .............................................. G01B 5/20
[52] U.S. Cl. ...................................... 33/567; 33/545; 33/549; 33/529
[58] Field of Search ..................... 33/567, 501.05, 502, 33/503, 545, 546, 549, 550, 551, 553, 555, 529, 568

[56] References Cited

U.S. PATENT DOCUMENTS

| | | | |
|---|---|---|---|
| 1,426,658 | 8/1922 | McGuckin | 33/567 |
| 3,203,100 | 8/1965 | Hegedus | 33/549 |
| 3,286,354 | 11/1966 | Richter | 33/567 |
| 4,122,607 | 10/1978 | Hopf | 33/555 |
| 4,593,476 | 6/1986 | Clark et al. | 33/545 |
| 4,604,813 | 8/1986 | Kawanami et al. | 33/549 |
| 4,689,891 | 9/1987 | Clark | 33/529 |
| 4,769,763 | 9/1988 | Trieb et al. | 33/503 |
| 4,835,718 | 5/1989 | Breyer et al. | 33/503 |
| 4,976,043 | 12/1990 | Bieg | 33/545 |

Primary Examiner—William A. Cuchlinski, Jr.
Assistant Examiner—C. W. Fulton
Attorney, Agent, or Firm—Dykema Gossett

[57] ABSTRACT

A fixture type gauge (20) includes a base (22) and a plurality of segment blocks (1-12) mounted on the base (22) configured and arranged to allow comparison of manufactured parts (46) with a reference standard. Under computer control, reference marks (36, 54, 56, etc.) and data (26) are laser etched on the gauge base and segment blocks to facilitate rapid, accurate assembly of the gauge parts and provide a permanent record on the gauge of part related information. Laser machined alignment holes (30, 32) in the gauge base establish a reference axis on the base which can then be used to physically align the gauge with an independent spatial coordinate system, such as that of a coordinate measuring machine.

39 Claims, 13 Drawing Sheets

| P/N 93BB-2L111-CC | | | 4.75 O.D. | |
|---|---|---|---|---|
| PTS | X | Y | Z | RAD |
| AL1 | 4164.0 | 461.0 | 508.0 | 0.00 |
| AL2 | 4187.0 | 455.0 | 529.0 | 15.0 |
| AL3 | 4168.0 | 460.0 | 564.0 | 15.0 |
| AL4 | 4167.0 | 361.0 | 580.0 | 15.0 |
| AL5 | 4232.0 | 324.0 | 580.0 | 15.0 |
| AL6 | 4322.0 | 272.0 | 655.0 | 15.0 |
| AL7 | 4322.0 | 272.0 | 694.0 | 15.0 |
| AL8 | 4314.0 | 223.0 | 694.0 | 15.0 |
| AL9 | 4311.0 | 152.0 | 623.0 | 15.0 |
| AL10 | 4386.0 | 67.0 | 623.0 | 15.0 |
| AL11 | 4451.0 | 67.0 | 623.0 | 15.0 |
| AL12 | 4457.0 | 67.0 | 687.0 | 15.0 |
| AL13 | 4457.0 | 210.0 | 687.0 | 15.0 |
| AL14 | 4497.0 | 210.0 | 687.0 | 15.0 |
| AL15 | 4497.0 | 246.0 | 687.0 | 0.00 |
| TOTAL CL LENGTH: | | | 977.0 | |

| X | 19.05 |
|---|---|
| Y | 4127.50 |
| Z | 744.80 |

FIXTURE GAUGE AND METHOD OF MANUFACTURING SAME

TECHNICAL FIELD

The present invention generally relates to gauges and measuring devices, and deals more particularly with a fixture-type gauge, typically custom manufactured for determining the conformance of a plurality of manufactured parts with a reference standard.

BACKGROUND ART

One type of gauge, sometimes referred to in the art as a fixture gauge, is commonly employed to determine the conformance of one or more manufactured parts with a reference standard. For example, engine fuel lines used in automobiles typically made of metal include a number of bends and turns to accommodate the particular frame, body and engine components of a vehicle in which it is used. The features of manufactured parts, such as the fuel lines mentioned above, must be periodically compared with the reference standard corresponding to an ideal part in order to determine whether unacceptable variation in these features has occurred due to changes in material supply or manufacturing processes.

Although a number of techniques and materials are sometimes used to manufacture these gauges, one broad class comprises wooden gauges manufactured by ordinary woodworking techniques and hand tools. Typically, the woodworker is provided with a drawing of an ideal part forming the reference standard and/or a set of three-dimensional spatial coordinates and bending radii which define the standard. Using a plan view layout of the proposed gauge, the woodworker scribes reference lines on a base using a knife and may jot down a handwritten dimensions next to the associated line; this establishes features of the gauge in two dimensions on the wooden base. A vertical measuring stick is then used to determine the height of the wooden gauge blocks in a third dimension which are to be secured on the base along the previously scribed lines. The woodworker then must determine the three-dimensional intersect points on the blocks which define the reference standard, and then again record these on the blocks using a knife, ruler or the like. The three-dimensional intersect points typically may define, for example, the central axis of a tube type part. At best, the woodworker may employ a digital height gauge including a scribing apparatus adapted for measuring and marking the intersecting points on the blocks. In any event, it may be appreciated that the accuracy of such gauges is limited to the woodworker's skills in measuring and scribing lines, and his or her visual resolution of scales and measurements. Errors in this respect are common place; shadows can mislead the woodworker as to the exact placement of lines and features, and errors can easily be introduced during the process of scribing, shaping and final placement of the blocks on the gauge base. Because of the nature of the gauge making process described above, prior gauge makers necessarily require a relatively high degree of skill in the gauge making art, and typically a number of years of experienced was required to reach this necessary skill level.

There is therefore a clear need in the art for an improved gauge and method of manufacturing same which not only substantially reduces the time required to manufacture the gauge, but results in higher gauge accuracy. The present invention is directed towards filling this need.

SUMMARY OF THE INVENTION

According to one aspect of the invention, a method of manufacturing a gauge comprises providing a set of spatial coordinates defining a reference standard, producing a set of programmed instructions using the coordinates, automatically etching reference marks on a plurality of gauge part blanks using the programmed instructions, and assembling the gauge parts into fixed relationship with each other using the reference marks to align the parts relative to each other. Multi-dimensional views of the gauge parts may be generated using the programmed instructions, if desired. The gauge part blanks are rough cut to dimensions larger than the finished gauge parts. The etching process is preferably carried out using a laser, and additional lines are preferably etched to define the outer, finished contours of the part as well as the contour lines of the parts to be gauged. The gauge parts include both a base and a plurality of segment blocks. The gauge part blanks are preferably etched by placing them on a "ready board" disposed on a stationary base, and moving the laser over the board to successively etch each of the blanks. The ready board comprises a planar member having a plurality of rectangular openings therein defining edge guides for proper placement of the blanks relative to the coordinate system used by the laser. A physical reference axis is established on the gauge base by forming a pair of spaced apart apertures in the base, whose centers define this reference axis. These apertures are preferably formed by first machining a pair of depressions in the base, then by securing a pair of inserts in these depressions which may be machined with high accuracy, and finally laser drilling cylindrical holes in the inserts. The cylindrical side walls of these holes may be contacted by a coordinate measuring machine used to determine the exact centers of the holes and thus, the position of the reference axis.

According to another aspect of the invention, a method is provided for manufacturing a gauge for comparing a part with a reference standard, comprising the steps of laser etching reference marks on a gauge base and a plurality of gauge segment blocks under control of a programmed set of instructions, and mounting the etched segment blocks on the base using the reference marks to align the segment blocks relative to each other on the base.

A further aspect of the invention resides in a gauge assembly for comparing a part with a reference standard, comprising a base, a plurality of segment blocks mounted on the base, means on the segment blocks for supporting the part to be gauged, and at least first and second sets of laser etched alignment marks respectively on the base and segment blocks, the first and second sets of alignment marks being respectively aligned with each other to aid in quick, accurate assembly of the parts and to verify that the segment blocks are mounted on the base in proper relationship with each other to define the reference standard.

Accordingly, it is an important object of the present invention to provide a fixture-type gauge which possesses greater accuracy than that heretofore achievable using conventional methods and manufacturing tools.

Another important object of the invention is to provide a method for manufacturing a gauge of the type described above which substantially reduces the number of man hours required to manufacture the gauge, which decreases the level of skill needed by the gauge maker to manufacture the gauge, and which substantially increases the quality and measuring accuracy of the gauge.

A further object of the invention is to provide a gauge and method of making same which permits additional indicia, reference marks and reference data to be etched permanently and directly on the gauge.

A still further object of the invention is to provide a gauge and method of making same as described above which allows batch processing of the various parts of the gauge during the manufacturing operation, thus simplifying and substantially reducing the time required to make the gauge, and facilitating the simultaneous manufacture of multiple gauges.

A still further object of the present invention is to provide the establishment of a permanent reference axis directly on the base of the gauge which may be subsequently used to verify the accuracy of the various features of the gauge using, for example, a coordinate measuring machine.

These, and further objects and features of the present invention will become clear, or made apparent during the course of the following description of a preferred embodiment of the invention.

BRIEF DESCRIPTION OF THE DRAWINGS

In the drawings, which form an integral part of the specification, and to be read in conjunction therewith, and in which like reference numerals are employed to designate identical components in the various views.

DETAILED DESCRIPTION OF A PREFERRED EMBODIMENT

Figure 1:
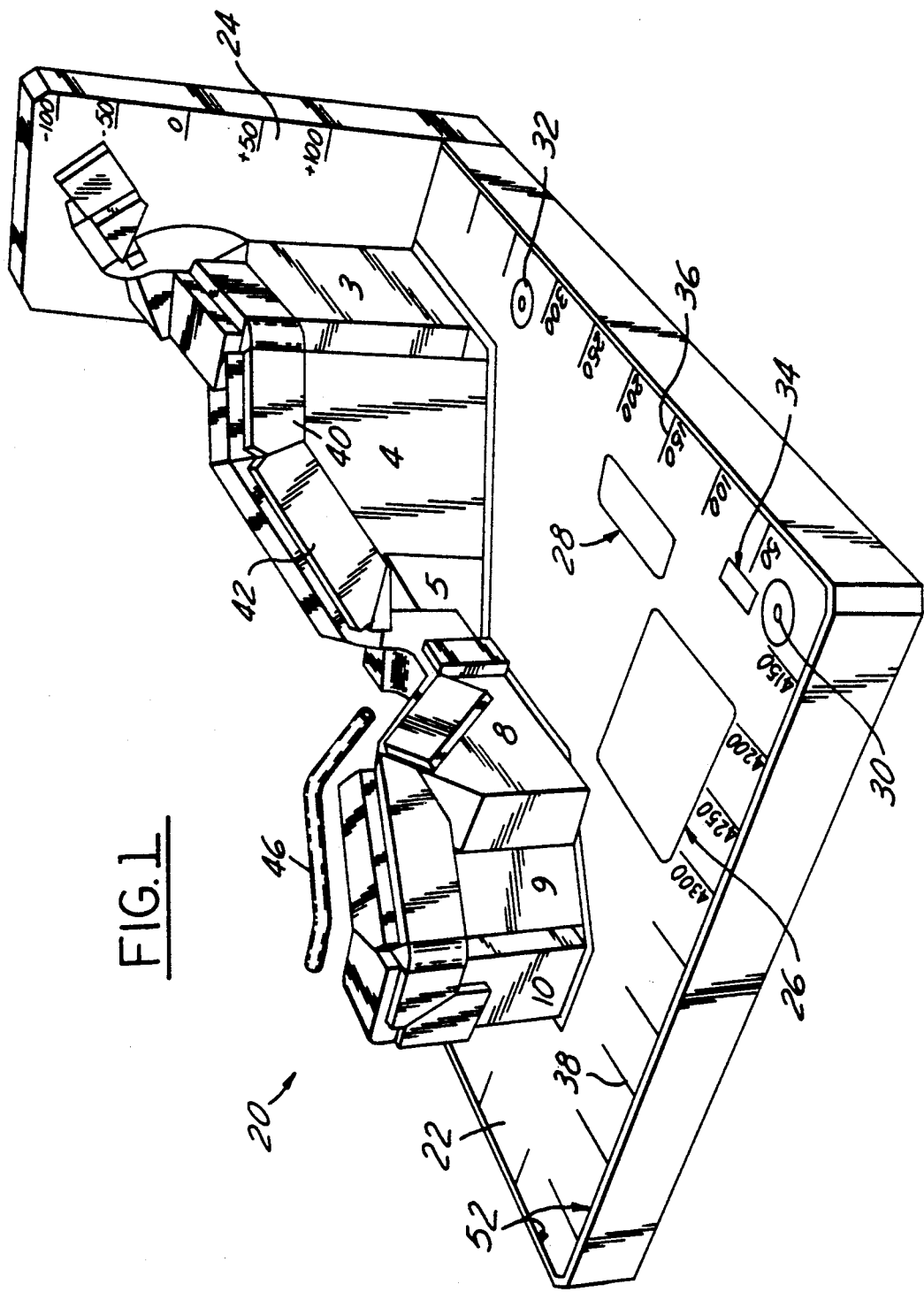
FIG. 1 is a perspective view of a fixture-type gauge manufactured by the method of the present invention, certain of the laser scribed indicia and reference marks not being shown for purposes of clarity, a tube to be checked on the gauge being shown in an elevated position.
Figure 2:
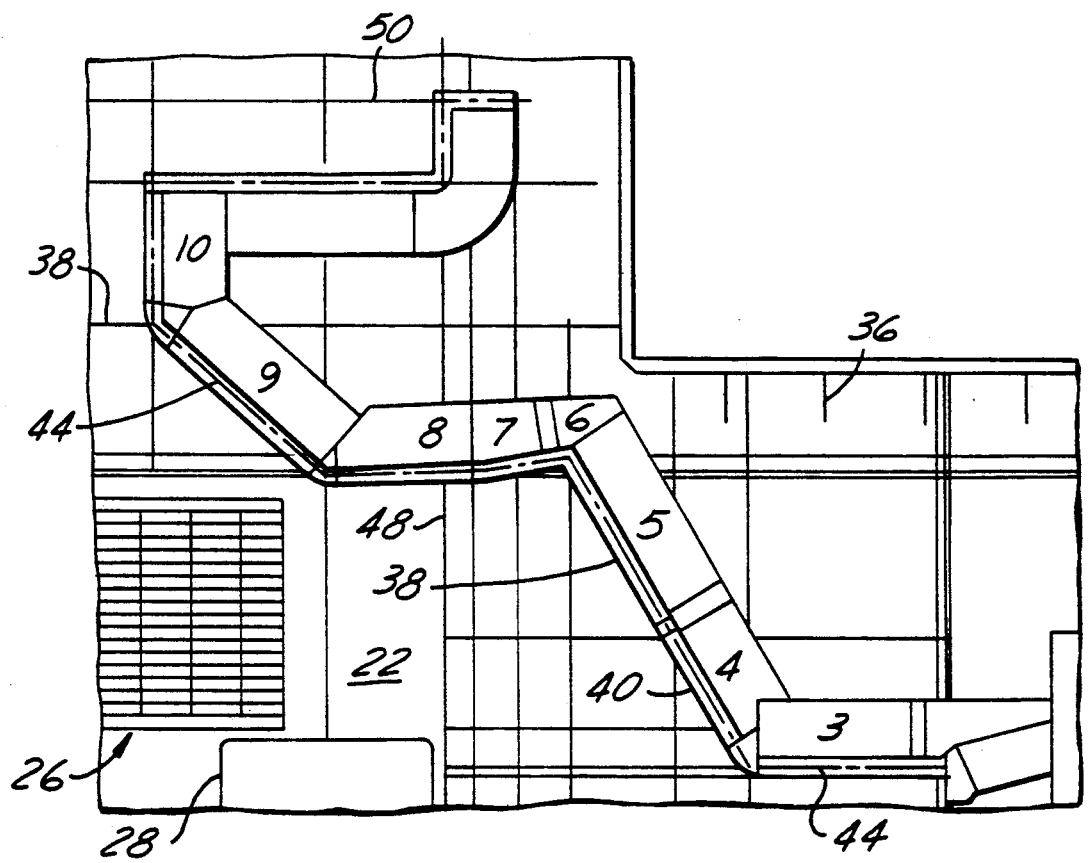
FIG. 2 is a fragmentary, plan view of a portion of the gauge shown in FIG. 1.
Figure 3:
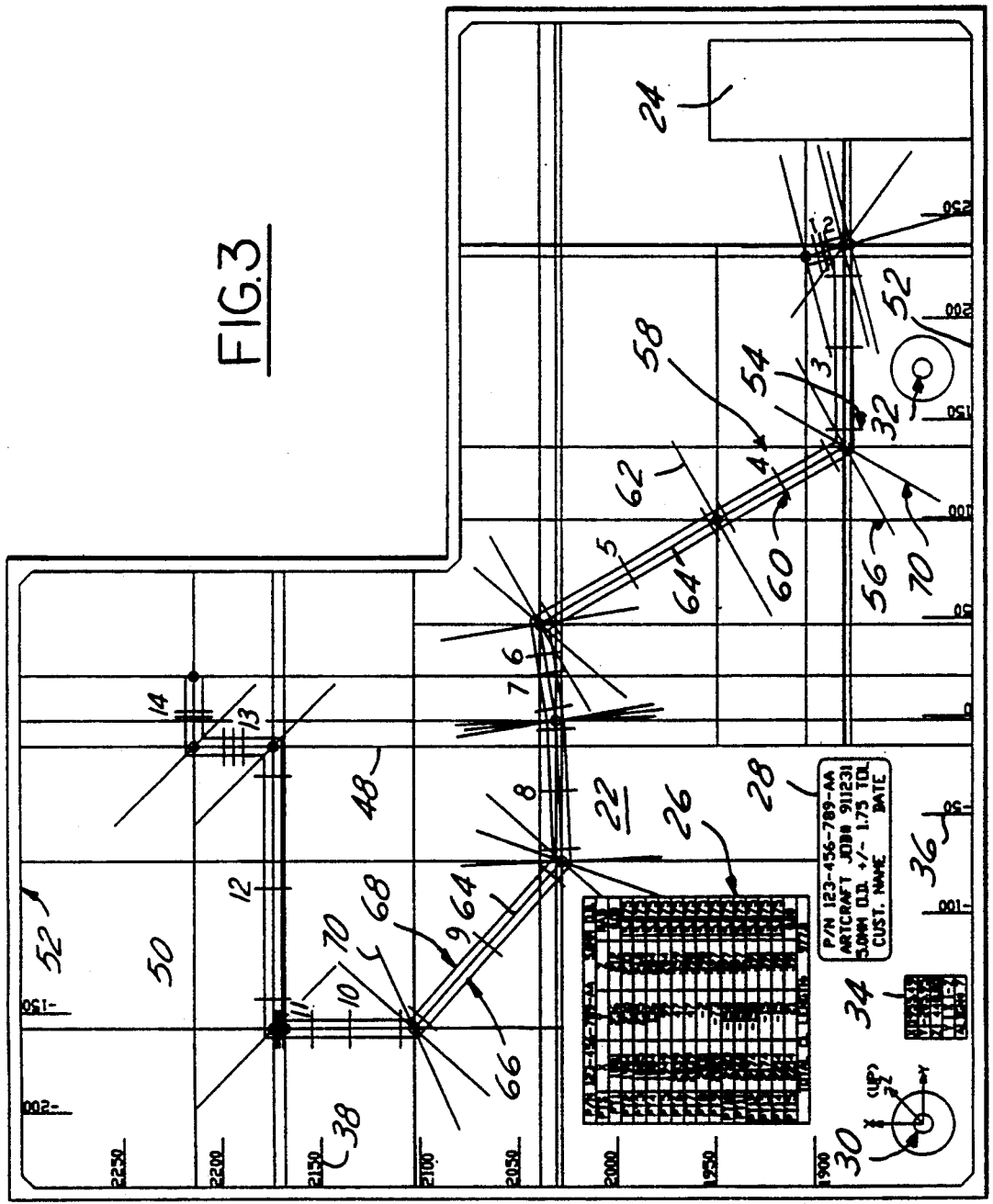
FIG. 3 is a plan view of the gauge base after etching, certain laser etched indicia and reference data not shown for purposes of clarity.
Figures 3A, 4:
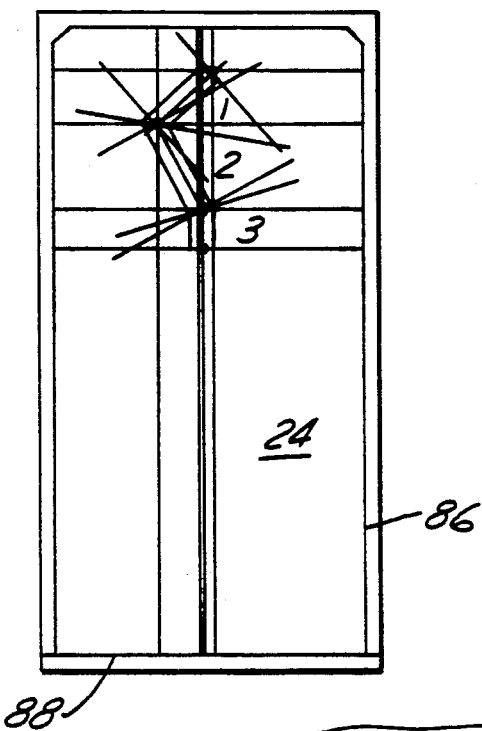
FIG. 3A is a plan view of the subbase forming part of the gauge shown in FIG. 1, following etching thereof, but before being cut to final size.
FIG. 4 is an enlarged, fragmentary view of a portion of the gauge base, depicting laser etched reference data thereon.
Figure 7:
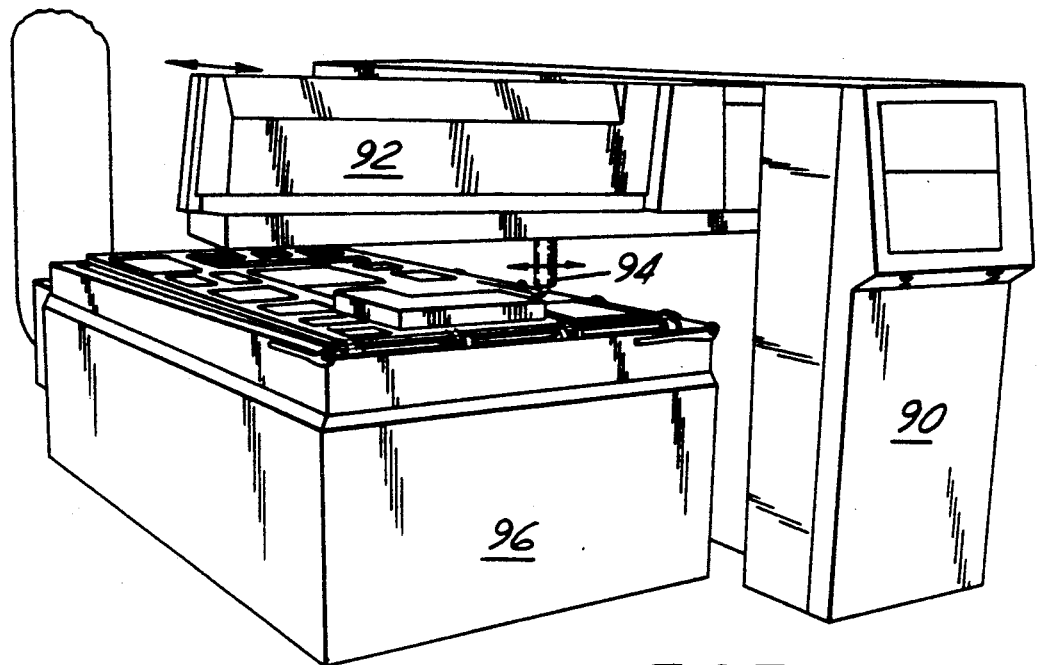
FIG. 7 is a perspective view of a laser apparatus carrying out laser etching on the gauge base.

Referring first to FIGS. 1, 2 and 4, the present invention relates to a fixture-type gauge, generally indicated by the numeral 20 in FIG. 1, as well as a method of making the gauge. The gauge 20 is manufactured according to a later discussed reference standard and is intended to compare a part, herein shown as a tube 46 for conformance of the geometry and location of its physical features with the referenced standard. Only a section of the tube 46 is shown in FIG. 1, elevated above its normal checking position, in order to better reveal the construction of gauge 20. Also not shown, but normally used, are a pair of pin center blocks mounted on the gauge 20 for engaging the opposite ends of and thus locating the tube 46 on the gauge 20.

The gauge 20 broadly comprises a generally rectangular base 22, on the upper surface of which there is mounted a plurality of segment blocks, herein designated respectively by the numerals 1-12, which numerals are etched in the lateral surfaces of the segment blocks by a later discussed laser etching process. The base 22 as well as the segment blocks 1-12 may be made of wood or other material with sufficient dimensional stability, machineability and the ability to be laser etched or cut. In the case of wood, the segment blocks 1-12 may be adhered as by gluing the same to the upper surface of the base 20 and/or screws (not shown) may be employed which extend through the base 22 into the bottom surface of the segment blocks 1-12. In the present example, due to the geometric configuration of the tube 46 being gauged, a sub-base 24 is employed which is secured to one edge of the base 22 and extends perpendicular to the top surface of the later. As best seen in FIG. 1, segment blocks 1 and 2 are secured on the sub-base 24.

A plurality of support blocks, two of these being indicated by the numerals 40 and 42 are respectively secured in precise positions on the lateral surfaces of the segment blocks 1-12, as by gluing. The support blocks 40, 42, etc. provide an underlying supporting surface extending perpendicularly from the sides of the segment blocks 1-12 in order to support the tube 46; the adjacent lateral sides of the segment blocks 1-12 provide lateral support for the tube 46 during checking. As will be explained later in more detail, each of the segment blocks 1-12 includes reference marks on the lateral surfaces thereof which, among other things, provides scribe lines for precisely positioning the support blocks 40, 42 when they are secured to the lateral surfaces and the segment blocks 1-12.

The gauge 20 includes various reference marks, indicia and reference data laser etched therein so as to become a permanent part of the gauge 20. For example, the laser etched border 52 extends around the periphery of the base 22. A plurality of X axis reference grid marks 36 are etched along one edge of the base 22, while a plurality of Y reference grid marks 36 are etched along an adjacent edge of the base 22. The reference grid marks 36, 38 provide a convenient means for precisely locating features and parts on the upper surface of the base 22. Indeed, these X, Y grid references are employed in a cross reference table 26 which is also etched in the upper surface of the base 22. As shown in FIG. 4, the reference data table 26 includes identification of the part, a plurality of intersection points (AL1-AL15) which define reference points along the central axis of the tube 46. The table 26 further includes X, Y, Z data defining each of the intersection points AL1-AL15 as well as the radius of bend of the central axis of the tube at the corresponding intersect points AL1-AL15. The X and Y data in the table 26 correspond to the X, Y reference grid defined by the reference marks 36, 38, while the Z data in table 26 corresponds to the elevation of the intersect point above the top surface of the base 22.

In addition to the above-described laser etched information, also etched in the top surface of the base 22 is an identification block 28 which uniquely identifies the gauge 20, and a data block 34 which provides the X, Y, Z coordinates of the center of a first alignment origin aperture 30, located in the top surface of the base 22, near one corner thereof, a second alignment aperture 32 being located along one adjacent edge of the base 22, in the direction of the "X" axis. As will be described later in more detail, the alignment origin apertures 30, 32 provide a means for establishing a reference axis which may be used by a coordinate measuring machine employed to verify the location and accuracy of the features of the gauge 20.

Attention is now particularly directed to FIGS. 3 and 3A which respectively depict the base 22 and sub-base 24 after the surfaces thereof have been laser etched with various reference marks and data, but before the segment blocks 1-12 have been installed thereon. Each and every line or indicia shown on the surfaces of the base 22 and sub-base 24 have been laser etched in accordance with the method of the present invention. The laser etching technique, carried out under computer control results in reference marks and data information which are not only highly accurate but easily readable since the width of the etching laser beam, and thus the etched reference marks may be precisely controlled. The X lines are highly readable as a result of the laser beam having carbonized and thus blackened those areas of the surface upon which the beam impinges. In addition to the various reference marks and data etched on the surface of the base 22 shown in FIG. 1, there is also etched a plurality of perpendicular, vertical and horizontal reference lines, 48 and 50 respectively, a border 52, tangent lines 54, segment block square lines 56, segment block labels 58, segment midpoint lines 60, segment square lines 62, segment center lines 64, outside and inside reference lines representing the outside permissible position of the tube 46, and segment miter lines 70. The adjacent pairs of tangent lines 54 mark the boundaries of the radius of the bends in the tube 46 defined by the references standard and set out in table 26. The pairs of segment block square lines, e.g. 56, 62 extend perpendicular to the center line 64 and mark the opposite ends of each of the segment blocks 1-12. The segment miter lines 70 indicate the angles of the mitered outer ends of certain of the segment blocks where bends in the tube 46 are present. The various reference lines mentioned immediately above facilitate rapid, highly accurate placement of the segment blocks 1-12 on the base 22 (and sub-base 24) during the assembly process.

Figure 5:
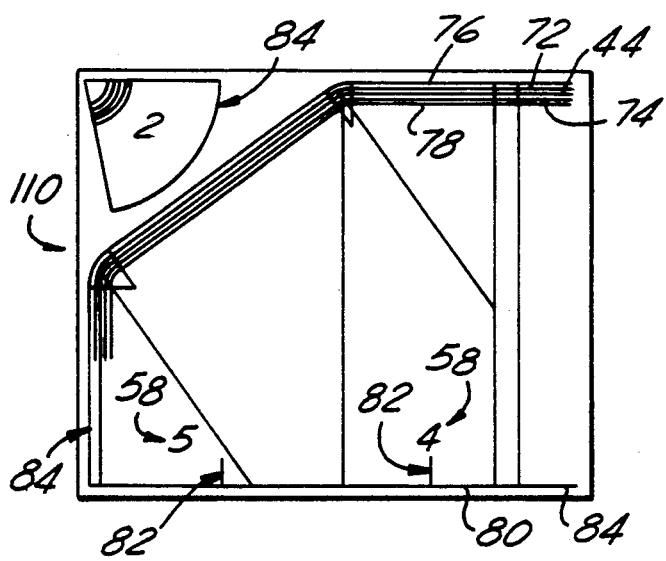
FIGS. 5 and 6 respectfully show a pair of gauge block blanks after laser etching, each including a pair of gauge block segments.
Figure 6:
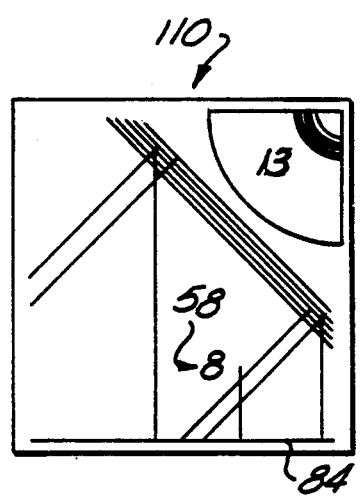

Attention is now directed to FIGS. 5 and 6 which respectively depict a pair of block blanks 110 on which various reference marks and indicia have been laser etched to define future segment blocks. Specifically, the blank 110 shown in FIG. 5 includes segment blocks 2, 4, and 5 while the blank 110 of FIG. 6 depicts segment blocks 8 and 13. As will be discussed later in more detail, after the blanks 110 are laser etched in the manner shown in FIGS. 5 and 6, the respective segment blocks 1-12 are individually cut out from the blanks 110 and machined to their final shapes. As particularly shown in FIG. 5, the following reference lines are laser etched to follow the length of the tube 46: reference line 44 corresponds to the center of the tube 46; reference lines 72 and 74 depict the normal upper and lower lines of the tube 46; and, reference lines 76 and 78 respectively depict the upper and lower outer tolerance boundaries of the tube 46 when it is installed in the gauge. Additionally, a segment block base line 80 defines the eventual bottom edge of the segment block 1-12, and an outer border line 84 is provided to define the remaining, finished outer boundary of the segment block. Segment block midpoint lines 82 are provided along the base line 80 which are intended to be lined up with the segment midpoint line 60 on the base 20 and sub-base 24.

The sub-base 24 shown in FIG. 3A is laser etched in a manner similar to that employed for the segment blocks 1-12. Note that the sub-base 24 includes an outer border line 86 as well as a finish base line 88.

Having described the basic components of the gauge 20, a method of manufacturing it will now be discussed. It is first necessary to obtain a set of X, Y, Z coordinate data as well as various information regarding bends in the tube as well as the tube diameter. This information is developed from a theoretical reference standard or an actual master part (tube) which is used as the reference standard. Normally, this information is provided either in the form of a simple table, such as the table 26 in FIG. 4 or by way of a drawing which defines the reference standard. This reference data is loaded into a computer program which generates all of the information which is necessary to laser etch the base 22, sub-base 24 and segment blocks 1-12, including data such as the total center line length of the part, rotational bend angle data, bend plane mathematical data, etc. The tube bend data processed by the program assists in determining whether errors are present in the original input data. For example, errors in the original data calling for negative tangent distances may result in overlapping bends without any straight section therebetween.

In any event, the computer program then designs the gauge by selecting the shapes of the segment blocks 1-12 and their placement on the base 20 and sub-base 24. The program determines the nature and placement of the various etched reference marks, intersect points, block shape, placement of the segment blocks and actual tube contour to be etched on the blocks. In effect, the program designs the various components of the gauge 20. The output of the program may be loaded into a CAD file in order to generate three-dimensional views of the gauge 20 and its various component parts, or alternatively, the output may be directly located into a CNC post-processing system, which will be discussed momentarily. The CAD output typically provides a two-dimensional hard copy view of the base and the blanks which include the segment blocks, essentially identical to FIGS. 3, 5 and 6 herein. One CAD system suitable for use in connection with the present invention is AUTOCAD Ver. 10.0 (DOS Version).

Having essentially designed the gauge 20 and its component parts using the computer program, the next step in the process is to rough cut a plurality of blanks from which the base 20, sub-base 24 and each of the segment blocks 1-12 will be formed. In some cases, as shown in FIGS. 5 and 6, a single blank block 110 may include more than a single segment block. The blank containing the base 20 is positioned in a known attitude on top of a stationary base 96 adjacent a conventional CNC controlled laser 90. The laser 90 may comprise a commercially available system, such as a Model OM 100 available from Robin Sinar of Plymouth, Mich., which employs a profile motion system manufactured by Laser Lab Limited of Cheltenham, Victoria, Australia and a Series 2000 CNC controller from Anca USA of Novi, Mich. The laser 90 includes a laser beam head 94 mounted for movement in a first axis of movement on an arm 92 which is in turn mounted on the frame of the laser 90 for movement along a second axis, perpendicular to the first. Thus, the laser head 94 from which a laser beam emanates downwardly toward the base 96 is movable under computer control in a plane which is substantially parallel to the top surface of the gauge blank base 20. Under CNC control, the laser 90 etches all of the various lines on the top surface of the base 20, which are depicted in detail in FIG. 3, as previously discussed. The laser beam penetrates and etches the wood (or other material of which the base is formed) to a depth of approximately 10/1000 to 40/1000 of an inch deep, and approximately 8/1000 of an inch wide.

Figure 8:
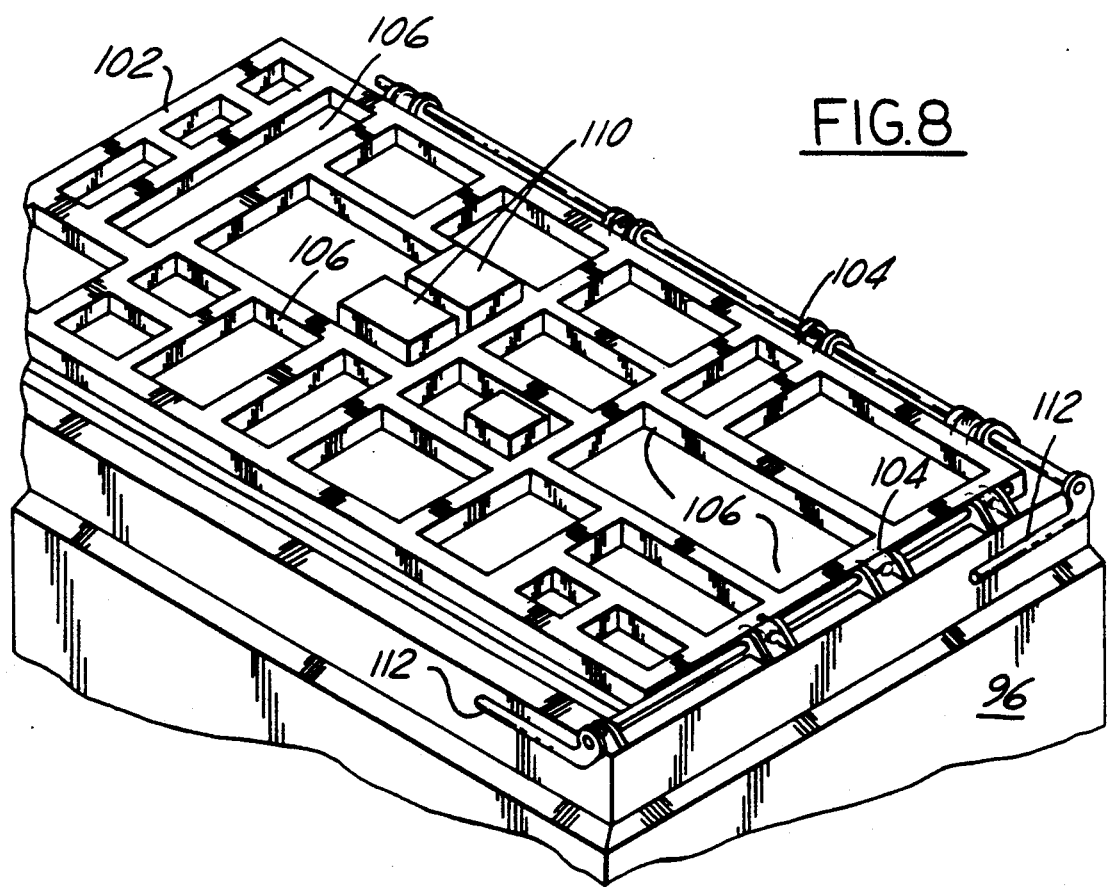
FIG. 8 is an enlarged, perspective view of the support bed and ready board used in the laser etching step, and depicting several gauge block blanks positioned ready for etching.
Figure 9:
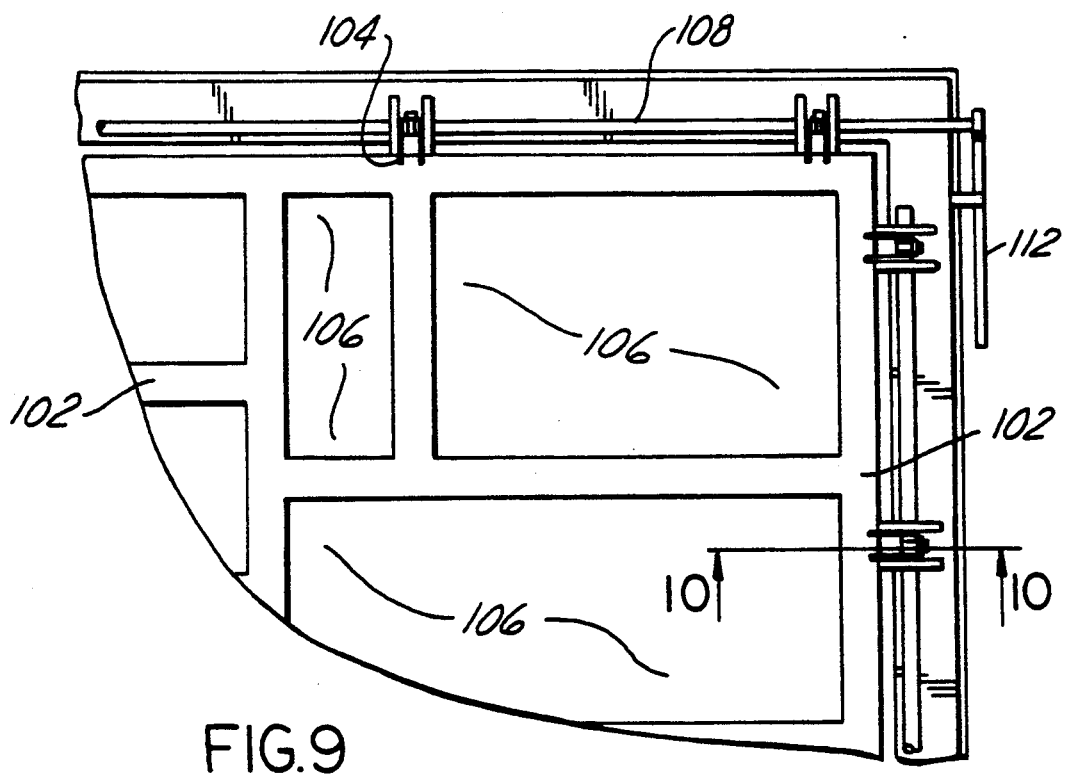
FIG. 9 is a fragmentary, plan view of a corner of the bed and ready board shown in FIG. 8, and better depicting the means for clamping the ready board in a fixed position.
Figure 10:
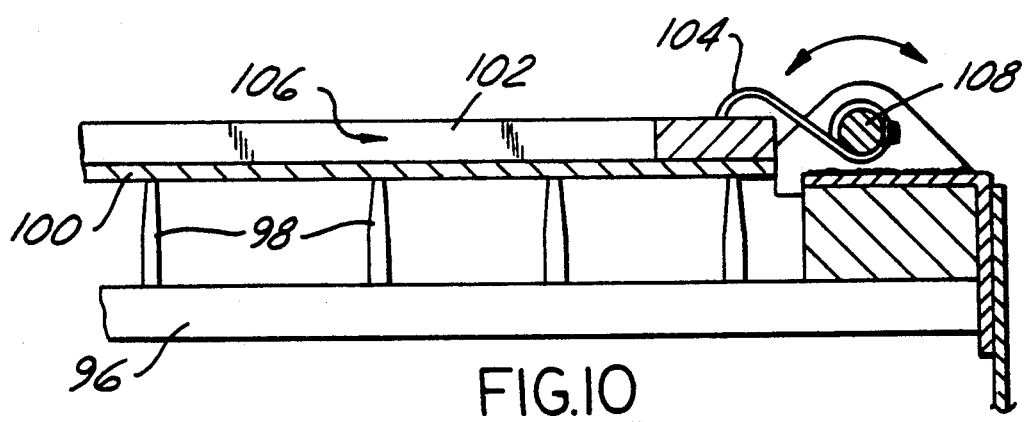
FIG. 10 is a cross-sectional view taken along line 10—10 in FIG. 9.

Having laser etched the base 20, it is then necessary to laser etch the various reference marks and data on the blank segment blocks 110, and in this connection reference is also now made to FIG. 8-10. Upon the table 96 there is provided a plurality of spacers 98 which elevate and support an underlay board 100. Mounted on the underlaid board 100 is a generally rectangular ready board 102 having a plurality of differently sized rectangular openings 106 therein. The periphery of the ready board 102 is clamped downwardly onto the table 96 by means of clamps 104 mounted on pivot rods 108 which are controlled by clamp handles 112. The openings 106 are cut out using precise machining techniques, such as by laser machining so that the openings 106 are precisely located in known relationship to each other, and thus can be accurately related to the spatial coordinate system used by laser 90. The size, placement and arrangement of the openings 106 may be derived empirically on a "best fit" basis so as to accommodate receipt of blank segment blocks 110 which are to be used in the manufacture of various types of gauges.

The ready board 102 is carefully positioned on the table 96 so that reference features on the board 102, such as one or more corners of the openings 106 are aligned and positioned in known relationship to the reference axis coordinate system used by the laser 90. Next, the blanks segment blocks 110, as well as the sub-base 24, are placed within the openings 106 such that two adjacent edges of each of the blank segment blocks 110 engage two interior side walls of the ready board 102 within one of the openings 106, thereby aligning the blanks 110 with the coordinate system of the laser 90. The nesting arrangement of the blanks within the various openings 106, and the choice of which openings 106 the blanks are placed in is predetermined by the previously discussed computer program, which typically outputs a drawing showing how the operator is to place and arrange the blanks 110 on the ready board 102. It should be noted here that the choice of location of the placement of the segment blocks 110 on the ready board 102 does not necessarily bear any relationship to the order or placement of the segment blocks 1-12 on the gauge base 20. Also, it should be noted that blank segment blocks 110 for a plurality of different gauges may be processed simultaneously. In other words, blanks 110 for several gauges may be placed within openings 106 in the same ready board 102 and then successively etched by the laser 90 in a single "batch".

Under computer program numerical control (CNC) the laser 90 then etches the various reference marks and data on the blank segment blocks 110, as previously discussed in detail. The next step in the manufacturing process involves the use of a saw or similar cutting device to cut closely to but not on the border lines 84, which results in separation of multiple segment blocks from the blanks 110 and yields a rough cut of the individual segment blocks 1-12; the laser 90 may also be employed for performing these same cutting operations. A further machining step is then employed, such as sanding or routing up to and into the laser etched border lines which, it will be recalled, are typically about 8/1000 of an inch wide. Final machining along the laser etched border lines 84 is performed under visual inspection which is facilitated by virtue of the fact that the laser etched lines are blackened by the etching process and thus easily visible and the machining operator can actually see the laser etched border line begin to "fall away" during the machining process, thus confirming that the machining tool is within 4/1000 of an inch from the theoretical center line of the laser etched border 84, i.e. within the 8/1000 of an inch width of the border line 84.

The next step in the manufacturing process involves fitting the segment blocks together and mounting them on the gauge base 20 and sub-base 24. The segment blocks 1-12 are typically attached to each other by means of a joint, and in the case of an angle, a miter joint. The particular manner in which the segment blocks 1-12 are attached to each other naturally depends upon the precise geometrical configuration of the gauge being made. The precise final features such as metered corners and the like can be confirmed for accuracy by simply placing the segment block on the gauge base 20 and verifying that the features of the block correspond and are aligned with the laser etched lines, e.g. miter line 70, on the gauge base 22. The individual segment blocks 1-12 having been fitted together and the support blocks 40, 42, etc. having been installed, the next step in the process involves mounting the segment blocks 1-12 on the gauge base 22. This is accomplished, as previously discussed, using adhesives and/or screws extending through the bottom of the gauge base 20 upwardly into the individual segment blocks 1-12. The segment blocks 1-12 may be cut at the tangent lines to allow the radius profile blocks to be inserted.

Figure 11:
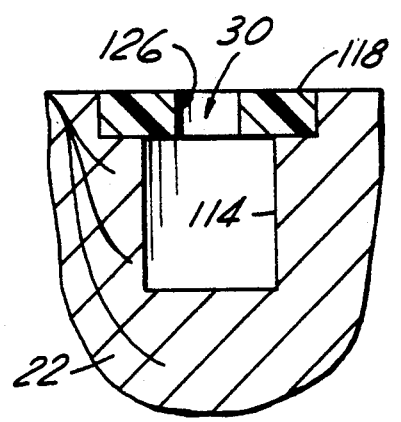
FIG. 11 is a cross-sectional view taken through one of the alignment apertures in the gauge base.
Figure 12:
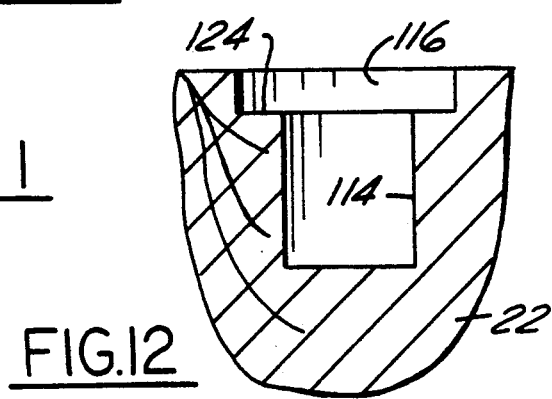
FIG. 12 is a view similar to FIG. 11 depicting a preliminary step in forming the aperture in the gauge base.
Figure 13:
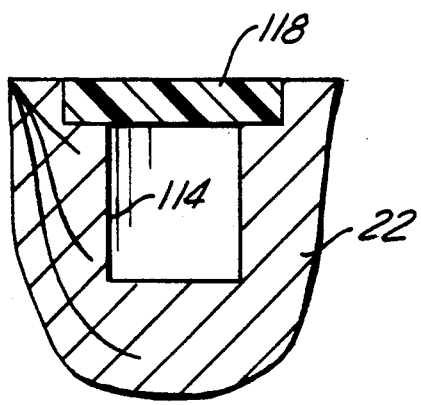
FIG. 13 is a cross-sectional view similar to FIG. 12 but depicting a subsequent process step.
Figure 14:
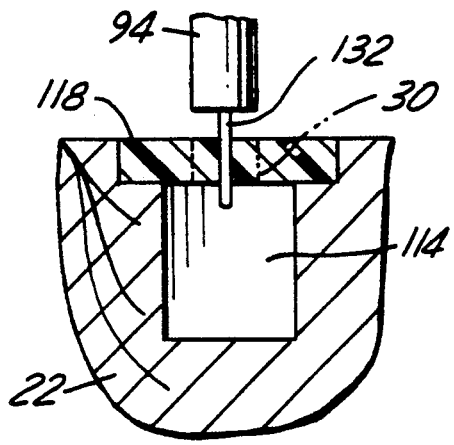
FIG. 14 is a cross-sectional view similar to FIG. 13 but depicting a still further processing step.
Figure 15:
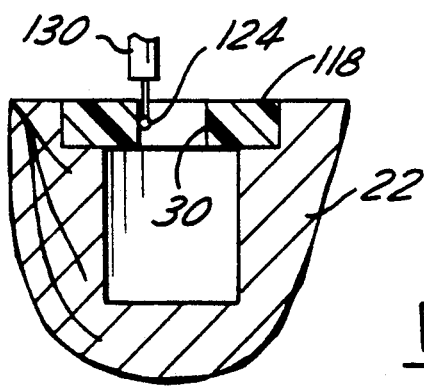
FIG. 15 is a cross-sectional view similar to FIG. 11 and depicting the positioning of a probe within the reference axis alignment aperture during the process of establishing the reference axis.
Figure 16:
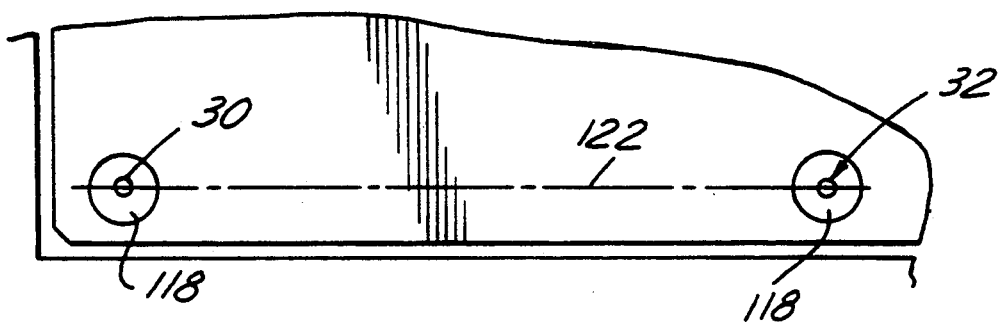
FIG. 16 is a fragmentary, plan view of one side of the gauge base showing the reference axis established through the centers of the reference axis alignment apertures.

Following assembly, the various features of the gauge 20 may be certified by use of a cooridante measuring machine (CMM) or the like. In this connection, the provision of the axis origin and axis alignment holes 30, 32 provides a simple and reliable means of aligning the gauge relative to the coordinate system of the CMM. As best seen in FIG. 11, the axis origin and axis alignment holes 30, 32 each comprise a vertical, cylindrically-shaped opening in a circular insert 118, wherein the cylindrical side wall 126 has been precisely machined. The alignment holes 30, 32 are preferably formed in the following manner and reference is now made to FIGS. 12-14. First, a circular bore 114 is machined in the base 22, following which a concentric counterbore 116 is formed to define an annular shoulder 128. A circularly shaped, blank 118 formed of a material of high dimensional stability is secured as with adhesives within the counter bore 116, resting on the annular shoulder 128. During the previously described process of laser etching reference marks on the gauge base 22, or in a separate operation, the laser 90 is employed to machine the cylindrical alignment hole 30 in the blank insert 118; this step is depicted in FIG. 14 wherein the laser head 94 is positioned so as to direct the laser beam 132 downwardly to penetrate the blank 118. The alignment hole 30, 32 formed in this manner is thus precisely located in known relationship to the other laser etched reference marks on the base 22 as well as the individual segment blocks 1-12. The translation values from the axis origin hole to the part datum are etched adjacent to the axis origin hole as well as the axis alignment direction arrows and alignment number.

During the certification process, the gauge 20 is placed on the table (not shown) of a CMM and a contact type probe tip 124 carried on an arm 130 is guided into the hole 30, 32. The probe tip 124 is then driven into contact with the cylindrical side wall 126 at a plurality of locations, typically four, around the circumference of the side wall 126. In this manner, the central axis of the hole 30 is precisely located. This same process is then employed to locate the central axis of the second alignment hole 32. The plane of the top surface of the gauge base is developed and located by the CMM, into which the axis origin and axis alignment holes are projected. The central axes of the two alignment holes 30, 32 having been ascertained, a reference axis 122 is therefore established which is subsequently used to align the spatial coordinate system of the CMM with the position of the gauge 20.

Figure 17:
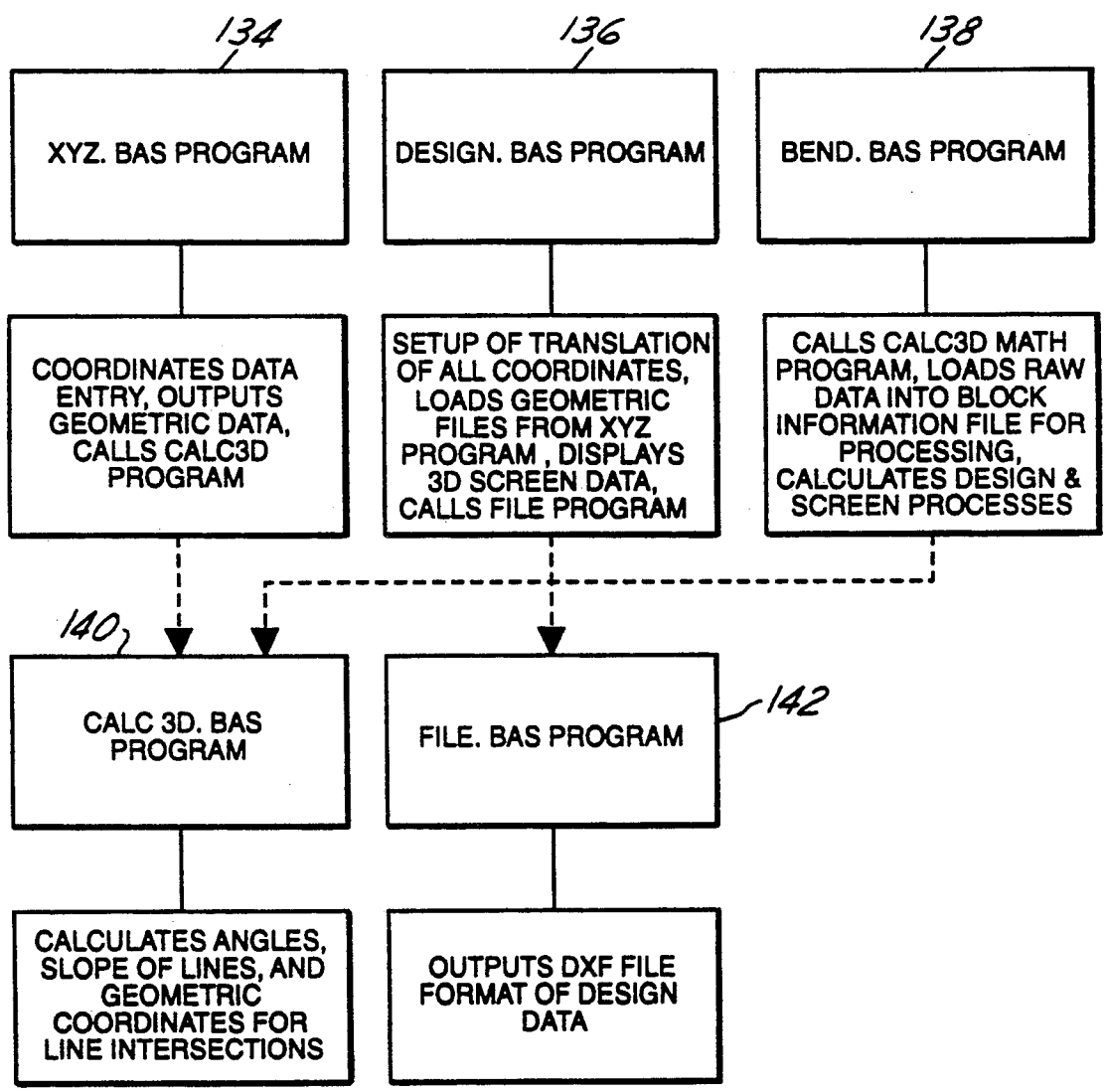
FIGS. 17-22 depict flowcharts for the computer program including the programmed set of instructions for controlling the laser etching process.

Reference is now made to FIG. 17 which is a combined block diagram and flow chart depicting the major routines of a suitable computer program for generating the necessary programmed set of instructions for controlling the above described laser etching process. The following description illustrates a typical program written in the QUICK BASIC language and is intended to be merely illustrative of many different programs that could be devised to carry out the laser etching process of the present invention. Broadly, the overall program comprises a XYZ.BAS Program 134, a DESIGN.BAS Program 136, a BEND.BAS Program 138, a CALC3D.BAS Program 140, and FILE.BAS Program 142. The XYZ.BAS Program 134 cooridantes data entry, outputs geometric data and calls up the CALC3D.BAS Program 140. The DESIGN.BAS Program 136 sets up translation of all input coordinates, loads geometric files from the XYZ.BAS Program 134, displays the CALC3D.BAS Program 140 screen data and selectively calls up opearton of the FILE.BAS Program 142. The BEND.BAS Program 138 calls up the CALC3D.BAS Program 140, loads raw data into a block information file for processing and calculates design and screen processes. The CALC3D.BAS Program 140 calculates the angles, slope of lines, and geometric coordinates for line intersections. Finally, the FILE.BAS Program 142 outputs DXF (drawing exchange format) file format of design data. The output of the DXF formatted design data from the FILE.BAS Program 142 is fed to a conventional CAD (computer aided design) system which then displays the gauge design in three dimensions.

Figure 18:
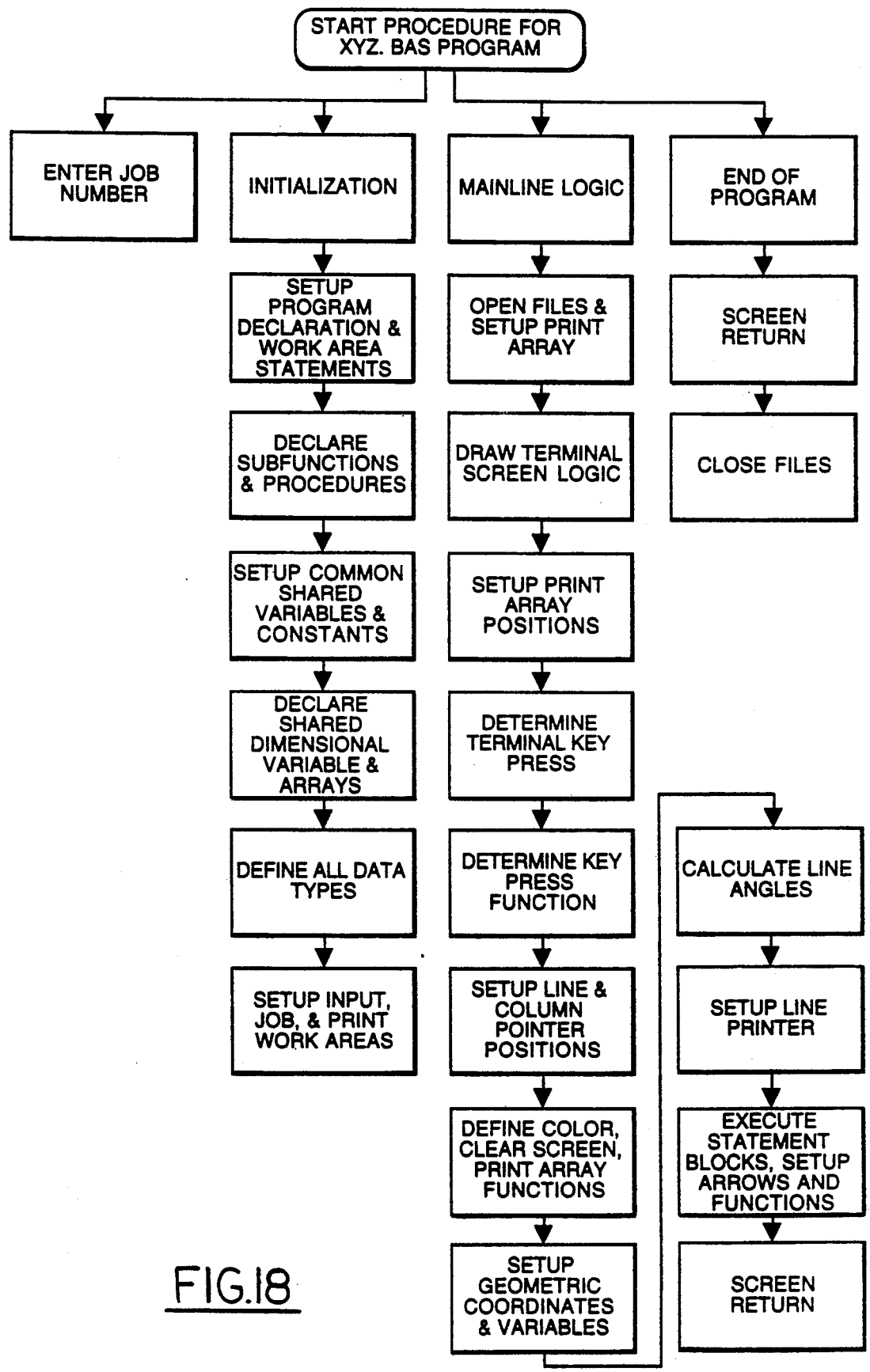

FIG. 18 is a flow chart for the XYZ.BAS Program 134. Referring now to FIG. 18, the first step in the XYZ.BAS Program 134 involves entering the job number, following which an initialization is performed. Then, program declaration and work area statements are set up, subfunctions and procedures used within the program are declared, the variables and constants that will be shared by different modules and subroutines within the program are set up and the shared dimensional variables and arrays are declared. Data types are then defined, and the final step of initialization involves setting up input, job and print work areas. At this point, the mainline logic is commenced by first opening up files and setting up the print array. Then, terminal screen logic is drawn and print array positions are set up. Next, a determination is made of whether or not a terminal key is pressed. Upon detection of the depression of a terminal key, line and column pointer positions are set up with respect to the XYZ coordinates for the program. Color, clear screen, and printer array functions are then defined following which geometric coordinates and variables are set up. At this point, the line angles are calculated, the line printer is then set up and subroutines are performed to execute statement blocks and set up arrows and functions. Finally, the program returns to the screen functions and files are closed to end the program, thus completing the procedure for entering the coordinates.

Figure 19:
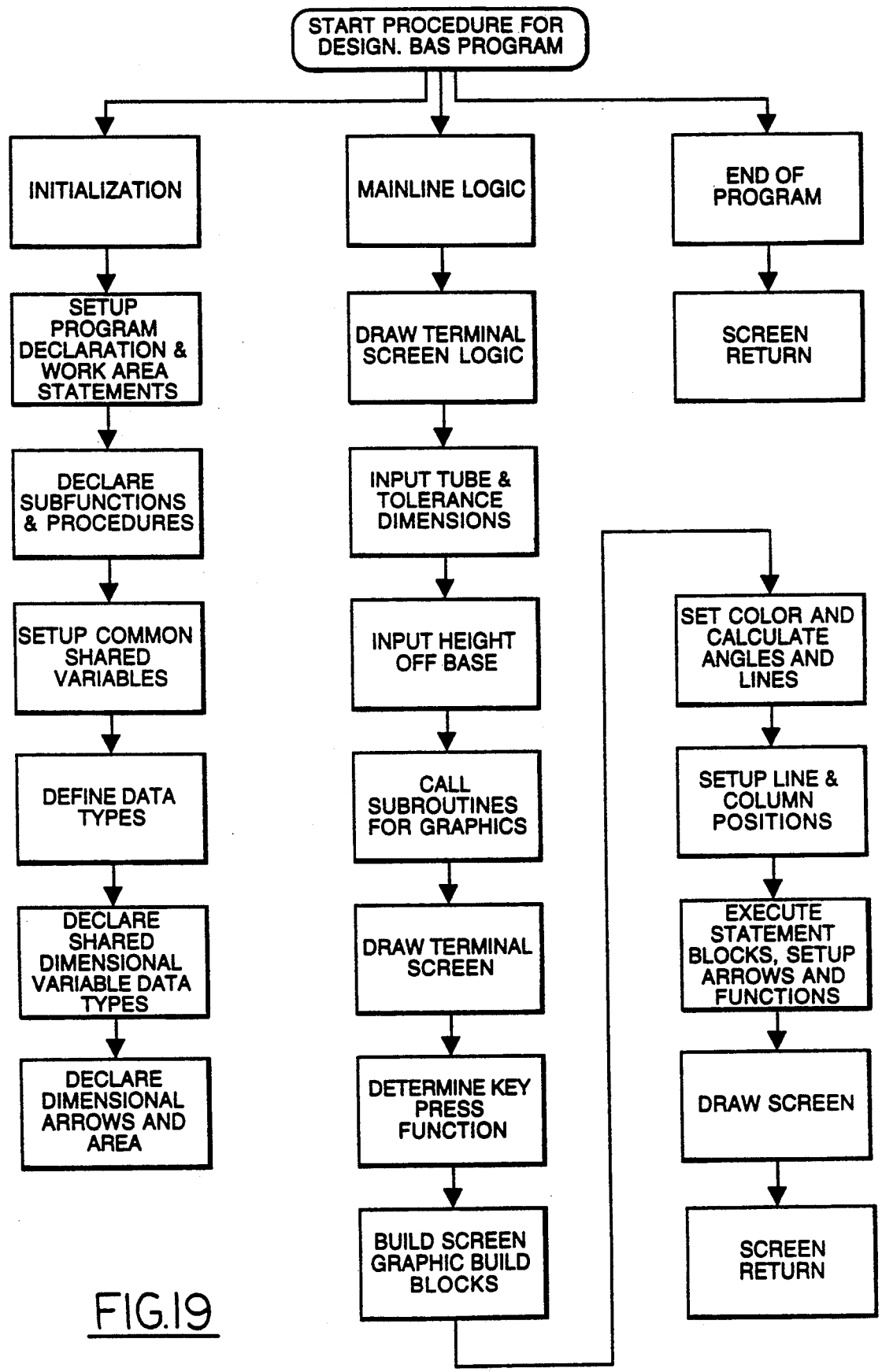

Attention is now directed to FIG. 19 which depicts a flow chart for the DESIGN.BAS Program 136. Initialization is commenced by setting up program declaration of work and work area statements, following which subfunctions and procedures are declared. Common shared variables are set up, the various data types are defined, shared dimensional variable data types are declared, and finally dimensional variable data types are declared. Having initialized the program, the mainline logic is commenced which involves drawing the terminal screen logic, inputting tube and tolerance dimensions, inputting the height off of the base information, calling subroutines for graphics, drawing the terminal screen and determining key press functions, i.e., whether or not a terminal key has been pressed. Next, screen graphic build blocks are generated, following which angles and lines are calculated and the color of various screen features is set. Next, line and column positions are set up, statement blocks are executed, arrows and functions are set up, and the screen is drawn. Finally return is made to the screen, thus ending the program.

Figure 20:
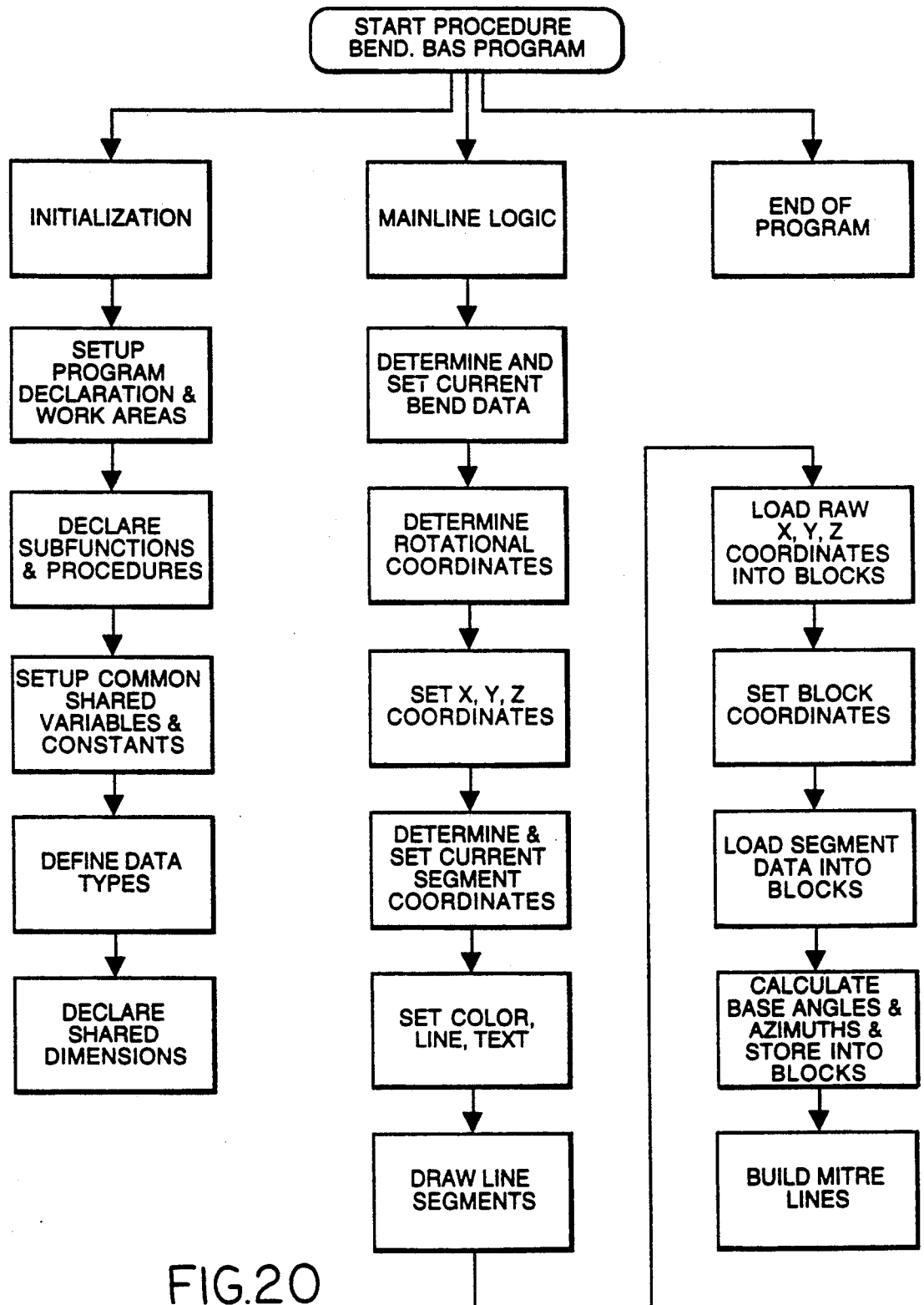

Attention is now directed to FIG. 20 which depicts a flow chart of the BEND.BAS Program 138. The program is initialized by setting up program declaration and work areas, declaring subfunctions and procedures, setting up common shared variables and constants, defining data types and, finally declaring shared dimensions. The mainline logic is then commenced which first involves determining and setting the current bend data. Next, the rotational coordinates are determined, the X, Y and Z coordinates are set and the current segments are then determined and set. The color, line and text is then set, line segments are drawn and the raw X, Y and Z coordinates are loaded into block information files. The block coordinates are then set, the segment data is loaded into the block information file and a calculation is then made of the base angles and azimuths and this calculated information is stored into block information files. Finally, the miter lines of the blocks are built, following which the program is ended.

Figure 21:
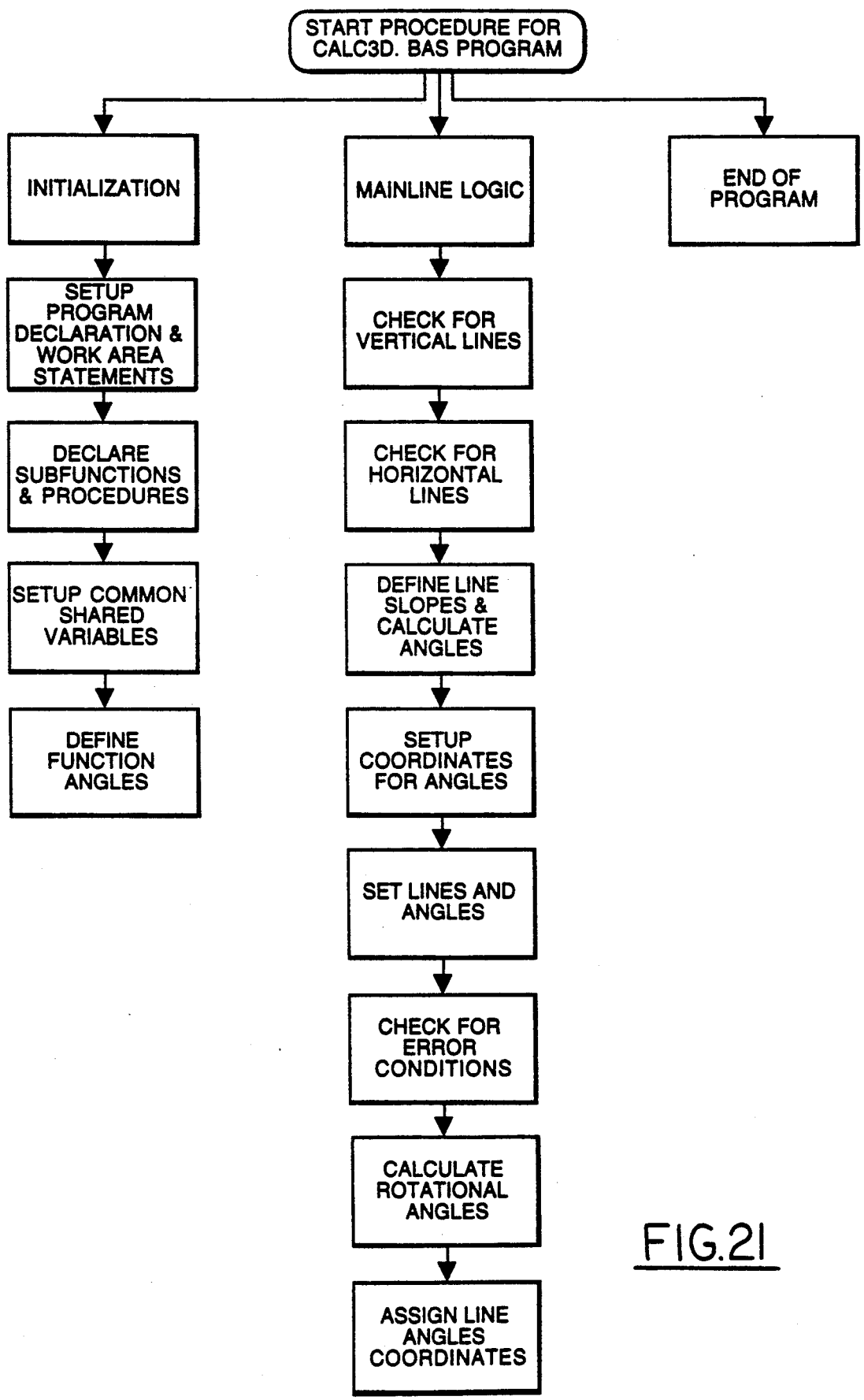

Attention is now directed to FIG. 21 which depicts a flow chart of the CALC3D.BAS Program 140. The program is initialized by first setting up program declarations and work area statements, declaring subfunctions and procedures, setting up common shared variables and defining function angles. Mainline logic is first commenced by checking for vertical lines, then checking for horizontal lines, defining the line slopes and calculating the angles of these slopes, setting up coordinates for the angles and then setting up the lines and angles. A check is then made for any error conditions that may exist so that errors may be detected before the component parts of the gauge are cut and etched. This error check will also reveal any mathematical errors. The rotational angles are then calculated following which line angle coordinates are assigned, and thereafter the program is ended.

Figure 22:
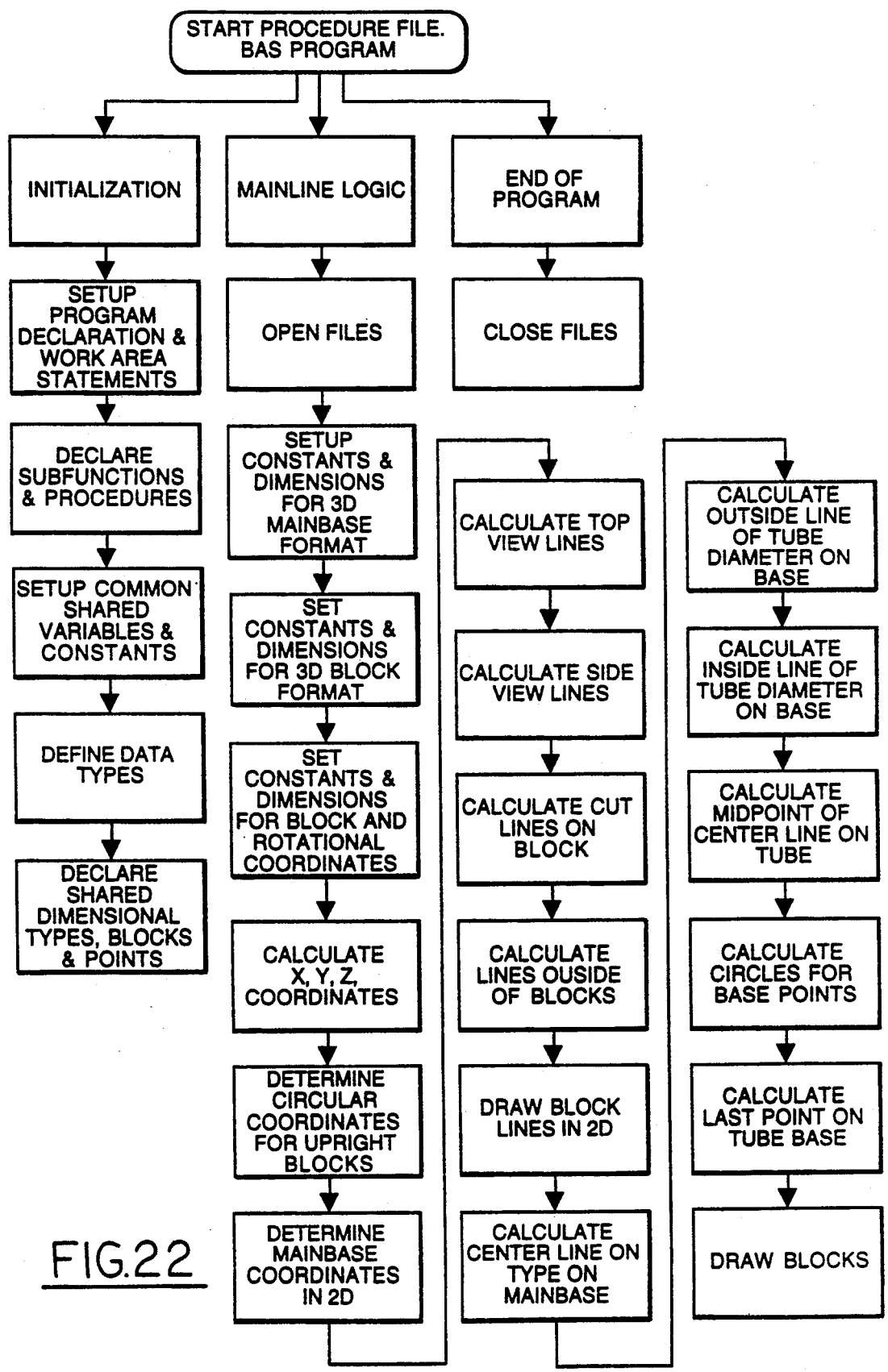

FIG. 22 depicts a flow chart for the FILE.BAS Program 142 which is called up by the DESIGN.BAS Program 136. Initialization is performed by setting up program declaration and work area assignments, declaring subfunctions and procedures, setting up common shared variables and constants, defining data types, and finally declaring shared dimensional types, blocks and points. The mainline logic is commenced by opening appropriate files and then setting constants and dimensions for the three dimensional main base format followed by setting the constants and dimensions for the three dimensional block format. The constants and dimensions for the block and rotational coordinates are then set and a calculation is made of the X, Y and Z coordinates. Next, a determination is made of the circular coordinates for the upright blocks (i.e., where they will be placed). Next, the main base coordinates are determined in two dimensions, in relationship to a common datum, following which the top view lines on the base are calculated. The sideview lines for the individual blocks are then calculated following which the cut lines for these blocks are calculated. The lines outside of the blocks are then calculated; these latter mentioned lines are those rough cut lines on the blocks discussed earlier hereinabove. The block lines are then drawn in two dimensions following which the centerline and type on the main base are calculated. Then, the outside line of the tube diameter on the base is calculated, the inside line of the tube diameter on the base is calculated, the midpoint of the centerline of the tube is calculated, the circles for the base points are calculated, and finally a calculation is made of the last point on the tube base. Finally, the blocks are then drawn.

At this point, an entire output CAD file has been completed and may be input to an automated CAD system. All of the various components, bases and segment blocks, as well as the various reference lines, marks and data to be etched thereon, may be viewed on the CAD system and further manual changes, as desired, may be carried out. The output CAD file may be then be processed by any conventional, commercially available post processing software to convert this file data into a format suitable for controlling the above discussed laser which is CNC controlled. Suitable past processing programs are as follows: TOOLCHEST 6.0 available from TC Dynamics, Inc. of Dublin, Ohio; CLEARCUT 386 available from Anilam of Miami, Fla.; and MASTERCAM 386 of Tolland, Conn.

From the foregoing, it is apparent that the gauge and method of making same described above not only provide for the reliable accomplishment of the objects of the invention, but do so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A method of manufacturing a gauge for checking conformance of features of a part with a reference standard, comprising the steps of:
   (A) providing a set of spatial coordinates defining said reference standard in terms of a three dimensional coordinate system;
   (B) producing a set of programmed, automated machine control instructions using said set of coordinates;
   (C) producing a plurality of gauge parts including a gauge and a plurality of gauge blocks;
   (D) etching reference marks on said gauge base and on at least certain of said gauge blocks using an automated machine controlled by said programmed instructions, said etching step including-
      (1) etching a first set of alignment marks on said base and said certain gauge blocks for aligning said certain gauge blocks relative each other on said base, and
      (2) etching a second set of alignment marks on said certain gauge blocks for use in positioning said part in a preselected attitude on said gauge, said first and second sets of marks defining said reference standard in terms of said three dimension coordinate system; and
   (E) securing said gauge blocks on said gauge base using said first set of reference marks to align said gauge blocks relative to said gauge base.

2. The method of claim step of: (F) automatically generating multidimensional views of at least certain of said gauge parts using said set of programmed instructions.

3. The method of claim 2, including the step of: (G) providing a plurality of said blanks respectively having rough dimensions greater than two dimensions of said gauge parts.

4. The method of claim 3, wherein step (G) is performed by cutting material to said rough dimensions.

5. The method of claim 4, including the step of: (H) removing material from each of said blanks using at least certain of said reference marks as guides, after completing step (C).

6. The method of claim 5, wherein step (D) is performed using a laser to carry out said etching.

7. The method of claim 6, wherein step (D) is performed by holding said blanks stationary and moving a laser head over said blanks.

8. The method of claim 7, including the step of aligning one edge of said base with a reference axis along which said laser is movable relative to said base.

9. The method of claim 6, including the steps of:
(I) providing a plurality of guides on a base and in predetermined relationship to said laser;
(J) placing said blanks respectively in said guides, whereby said blanks are aligned in predetermined relationship to said laser.

10. The method of claim 9, wherein step (I) includes the step of cutting a plurality of openings in a planar member, each of said openings defining one of said guides, and step (J) includes the step of abutting two edges of each of said blanks respectively along two contiguous edges of a corresponding opening.

11. The method of claim 1, wherein step (D) is performed using a laser forming part of said machine.

12. The method of claim 11, wherein step (D) is performed by moving a laser head over said blanks.

13. The method of claim 1, including the steps of:
(F) providing a plurality of said blanks each having rough dimensions greater than two dimensions of the corresponding gauge part;
(G) removing material from each of said blanks using certain of said reference marks as guides after completing step (C).

14. The method of claim 1, including the steps of;
(F) forming a plurality of openings in a planar surface, each of said openings defining a reference guide and being arranged at predetermined coordinates along a set of reference axes;
(G) placing said parts within said openings whereby said parts are arranged in known positions relative to said reference axes; then, performing step (D) by moving a laser and said parts relative to each other and in known relationship to said reference axes, said etching being performed by said laser.

15. The method of claim 1, including the step of securing part support blocks on said certain gauge blocks using said second set of reference marks as alignment guides.

16. The method of claim 1, wherein step (C) is performed by:
rough cutting each of said gauge parts to an approximate size, and
finish cutting each of said rough cut gauge parts using certain of said etched reference marks as guides defining the final dimensions of said parts.

17. A method of manufacturing a gauge for comparing a part with a reference standard, comprising the steps of:
(A) providing a set of spatial coordinates corresponding to said reference standard;
(B) producing a programmed set of instructions using said set of spatial coordinates;
(C) laser etching reference marks on a gauge base and a plurality of gauge segment blocks using a computer controlled laser beam operated by said programmed set of instructions; and,
(D) mounting said segment blocks on said base using said reference marks to align said segment blocks relative to each other on said base.

18. The method of claim 17, including the steps of:
(E) providing a plurality of blank segment blocks respectively greater in dimensions than the etched segment blocks mounted in step (D); and
(F) after step (C), removing material from said segment blocks etched in step (C) using certain of said reference marks as a guide corresponding to finished dimensions of said segment blocks, step (C) being performed after step (E) but before step (F).

19. The method of claim 17, wherein said reference marks etched in step (C) include:
first and second sets of alignment marks respectively on said base and said segment blocks and alignable with each other during step (D) to align said segment blocks relative to each other on said base, and
a set of tolerance marks on said segment blocks defining said standard and between which an acceptable part lies when placed on said gauge.

20. The method of claim 17, wherein step (D) is performed by adhesively securing said segment blocks on said base.

21. The method of claim 17, including the step of:
(E) forming a pair of alignment apertures in said base and lying along a reference axis.

22. The method of claim 21, wherein each of the apertures is formed by:
forming a first hole in said base;
securing a blank insert within said hole;
machining a cylindrical hole through said blank.

23. The method of claim 17, including the steps of:
(E) forming a plurality of part support blocks for supporting said part; and
(F) securing said part support blocks respectively on said segment blocks using the reference marks on said segment blocks etched in step (C) as alignment guides.

24. The method of claim 17, wherein step (C) is performed by:
placing both said gauge base and said segment blocks on a supporting surface in preselected to each other and in known relationship to a two dimensional coordinate system; and
relatively moving said laser beam and said supporting surface such that said laser beam moves to preselected positions in said coordinate system and thereby scans the surface of said gauge base and said segment blocks.

25. The method of claim 17, wherein step (C) includes the steps of:
etching a first set of alignment marks on said segment blocks along one edge thereof for aligning said segment blocks on said gauge base, and
etching a second set of alignment marks on said segment blocks spaced from said first set of alignment marks, said second set of alignment marks providing a guide for mounting part supporting blocks respectively in preselected positions on said segment blocks.

26. The method of claim 18, including the step of laser etching a set of tolerance marks on each of said segment blocks, said tolerance marks defining at least in part said reference standard and between which an acceptable part normally lies when an acceptable part is placed on said gauge.

27. A gauge assembly for comparing a part with a reference standard, said reference standard being defined at least in part by the spatial coordinates of the centerline of an ideal part, comprising:
a base;

a plurality of segment blocks mounted on said base;
means on said segment blocks for supporting said part;
first and second sets of alignment marks respectively on said base and said segment blocks, said alignment marks being disposed at preselected positions on said base and said segment blocks wherein said preselected positions are related to said spatial coordinates of said centerline of said ideal part, said first and second sets of alignment marks being respectively aligned with each other to verify that said segment blocks are mounted on said base in proper relationship with each other to define said standard.

28. The gauge assembly of claim 27, wherein the associated pairs of said first and second sets of reference marks are contiguous to each other at the interface between said segment blocks and said base.

29. The gauge assembly of claim 27, including a set of tolerance marks on said segment blocks defining said reference standard and between which an acceptable part normally lies when place on said gauge to perform a comparison.

30. The gauge assembly of claim 29, wherein said tolerance marks are laser beam etched marks.

31. The gauge assembly of claim 27, including a set of laser etched spatial coordinate data in said base and defining said standard.

32. The gauge assembly of claim 27, wherein said base includes a pair of apertures therein and aligned along a reference axis, said apertures being sufficient in cross sectional size to allow the probe of a coordinate measuring machine to enter therethrough.

33. The gauge assembly of claim 32, wherein said apertures each include an axially extending, cylindrical sidewall adapted to be contacted by said probe.

34. The gauge assembly of claim 27, wherein said alignment marks are laser beam etched marks.

35. A method of aligning a gauge relative to the coordinate system of a coordinate measuring machine, comprising the steps of:
(A) forming a pair of spaced apart alignment apertures in the base of said gauge such that said apertures lie along a reference axis bearing a known relationship to at least certain surface features of said gauge;
(B) placing said gauge base on a supporting surface associated with said coordinate measuring machine;
(C) using the probe of said measuring machine to contact interior surfaces of said gauge base which define said apertures in order to determine the positions of said apertures in said coordinate system;
(D) calculating the respective centerlines of said apertures, using the contact positions determined in step (C);
(E) determining the position of said reference axis using the centerlines calculated in step (D).

36. The method of claim 35, wherein step (A) is performed by:
forming a pair of spaced apart holes in said base,
securing a blank in each of said holes,
machining a cylindrical aperture in each of said blanks, the centerlines of said apertures lying along said reference axis.

37. A gauge alignment arrangement for use in aligning the physical feature of a gauge mounted on a base in known relationship to the coordinate system of a coordinate measuring machine, comprising:
a pair of spaced apart inserts in said base, each of said inserts having an aperture therein and being formed of a dimensionally stable material, each of said apertures being defined by a cylindrical interior sidewall in a respective one of said inserts which may be contacted by a probe of said coordinate measuring machine in order to determine the respective centers of said apertures,
the centers of said apertures being disposed in known relationship to the spatial coordinates of said physical features and lying along a reference axis establishing a known spatial relationship between the physical features of said gauge and the coordinate system of said measuring machine.

38. The gauge alignment arrangement of claim 37, wherein said base includes:
a pair of spaced apart openings therein, and
a pair of inserts respectively disposed within said openings, said apertures being defined respectively within said inserts, said inserts being formed of a relatively hard, machinable material.

39. The gauge alignment arrangement of claim 37, wherein said base is formed of wood

* * * * *

UNITED STATES PATENT AND TRADEMARK OFFICE
CERTIFICATE OF CORRECTION

PATENT NO. : 5,208,995

DATED : May 11, 1993

INVENTOR(S) : Blair T. McKendrick

It is certified that error appears in the above-identified patent and that said Letters Patent is hereby corrected as shown below:

Column 12, line 55, before "step" insert --1, including the--.

Column 15, line 23, change "place" to --placed--.

Signed and Sealed this

Fourth Day of October, 1994

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,208,995
DATED : May 11, 1993
INVENTOR(S) : Blair T. McKendrick

It is certified that error appears in the above-identified patent and that said Letters Patent is hereby corrected as shown below:

<u>Title page,</u>
Item [76], please correct the citizenship of the above-named inventor from that of the United States of America to that of Canadian.

Signed and Sealed this

Thirteenth Day of January, 2004

JON W. DUDAS
*Acting Director of the United States Patent and Trademark Office*